UNITED STATES PATENT OFFICE.

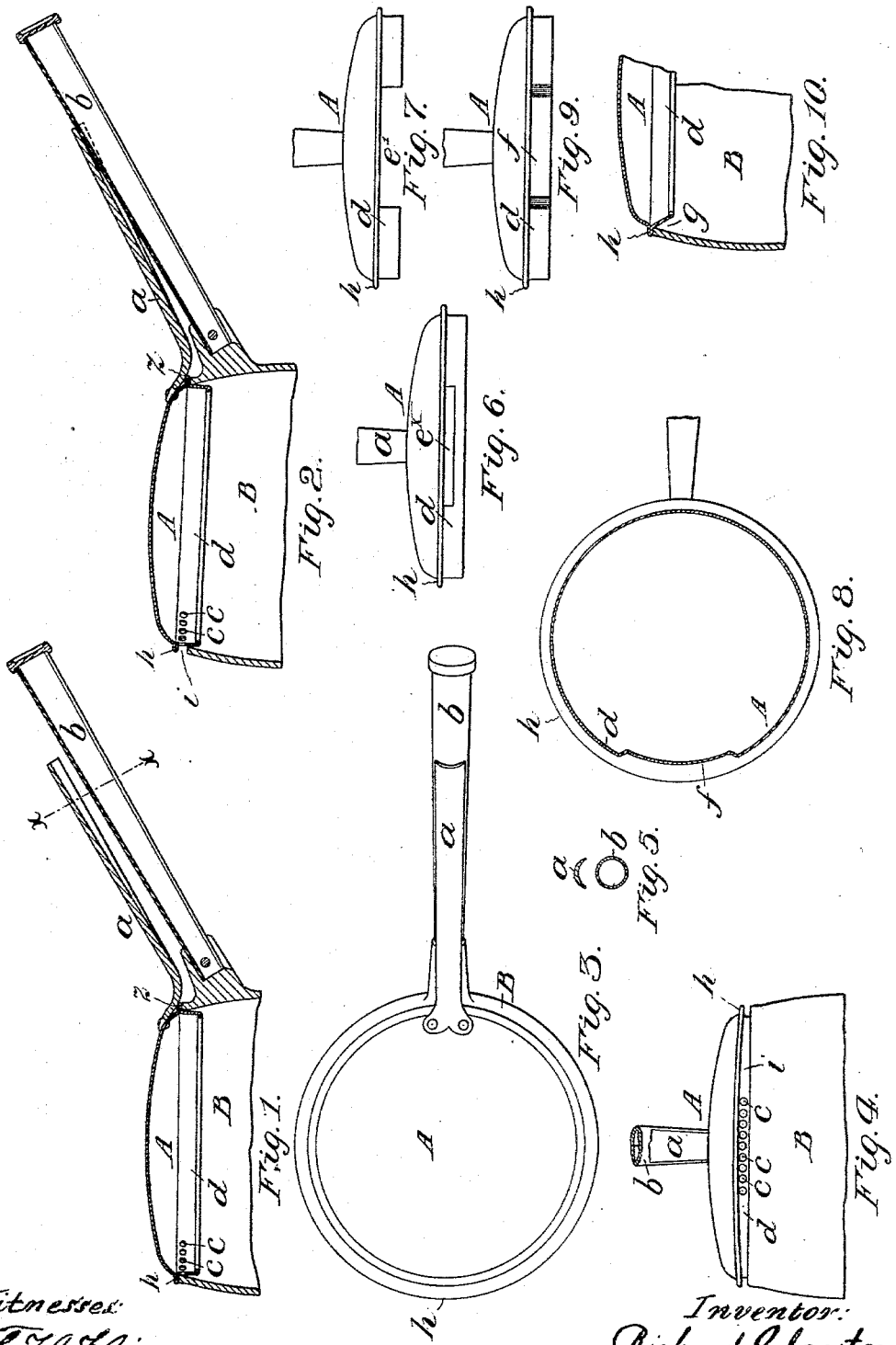
(No Model.)
R. CLAYTON.
COVER FOR COOKING UTENSILS, &c.
No. 561,763. Patented June 9, 1896.

RICHARD CLAYTON, OF SEDGLEY, ENGLAND.

COVER FOR COOKING UTENSILS, &c.

SPECIFICATION forming part of Letters Patent No. 561,763, dated June 9, 1896.

Application filed February 25, 1896. Serial No. 580,729. (No model.)

*To all whom it may concern:*

Be it known that I, RICHARD CLAYTON, a subject of the Queen of Great Britain, residing in Sedgley, in the county of Stafford, England, have invented certain new and useful Improvements in Covers for Cooking Utensils and the Like, of which the following is a specification.

This invention relates to covers for saucepans and similar utensils and vessels, and especially to such a vessel having a single straight handle projecting from the side thereof near the top; and the object is to facilitate the tilting or raising of the cover a little at one side, so as to be able to strain off the liquid from the solid contents of the vessel or permit the escape of steam and at the same time hold the raised cover firmly in this position.

The invention consists in so constructing the cover, which is loose and detachable from the vessel, that said cover will be so tilted and raised and held raised by the mere act of grasping the handles of the cover and vessel with the hand, and so that when so tilted or raised a passage-way for liquid or steam from the vessel will be formed.

In the accompanying drawings, wherein I have illustrated my invention as embodied in a saucepan-cover, Figure 1 is a vertical section in the plane of the handles of the saucepan and cover, showing a part of the saucepan and the cover closed thereon. Fig. 2 is a similar view to Fig. 1, showing the front edge of the cover raised by tilting the latter. Fig. 3 is a plan of the device as seen in Fig. 1. Fig. 4 is a front elevation as seen from the left in Fig. 2, showing the cover raised. Fig. 5 is a cross-section of the handles in the plane indicated by the line $x\,x$ in Fig. 1. Figs. 6 and 7 show slightly-modified forms of the cover. Fig. 8 is an under side plan view of the cover, illustrating another modified form thereof; and Fig. 9 is a front elevation of the cover seen in Fig. 8. Fig. 10 is a fragmentary sectional view illustrating still another modified form of the cover.

A represents as a whole the cover, in which the invention resides, and B represents the saucepan or other vessel or utensil. The cover has a handle $a$ and the vessel a handle $b$. When the cover is placed on the vessel, the handle $a$ extends out over and a little above the handle $b$, whereby the two handles may be conveniently grasped by the hand and brought together, when the cover will turn at its rear edge as on a fulcrum and tilt up its front edge. Ordinarily the handle $b$ will be round, and preferably the handle $a$ of the cover will be concavo-convex in cross-section, as seen in Fig. 5. When the cover is closed down tight, (see Fig. 1,) there will be a little space between the handles, and when the cover-handle is pressed down on the handle $b$ to the position seen in Fig. 2 the cover rocks about the point $z$ as a fulcrum.

The cover has a supporting-flange $h$ to rest on the top of the vessel B when the cover is in place and a pendent flange $d$, which extends down into the opening of the vessel and fits therein rather loosely. This pendent flange or part prevents the cover from being displaced laterally.

When the cover is tilted or elevated, as represented in Figs. 2 and 4, a space $i$ is formed between the supporting-flange $h$ and the top of the vessel, and opposite to this space $i$ a conformation is given to the pendent flange or part $d$ such as will form a passage-way and open communication between the interior of the vessel and the space $i$ when the cover is tilted. There are many ways to do this. In Figs. 1, 2, and 4 a series of small holes $c$ are represented in the front part of the flange $d$. In Fig. 6 is represented a long slot $e^x$ in said flange. In Fig. 7 a portion of the flange $d$ is wholly removed, forming a gap or opening $e'$. In Figs. 8 and 9 communication between the interior of the vessel and the space $i$ is established by displacing inwardly a portion $f$ of the flange $d$, so as to form a passage-way for the steam and liquid, and in Fig. 10 the flange $d$ is in part displaced, to about the same extent as seen at $f$ in Fig. 8, by forcing inward the free edge of the flange, leaving thus a passage-way $g$. In all of these constructions the same object is attained—namely, a narrow or restricted outlet for the steam and for the liquid when straining it off from the solid contents of the vessel.

The weight of the cover A keeps it down in place, normally, as seen in Fig. 1, and the handle $a$ thereof is so situated with reference to the handle of the vessel that when the two are brought together, as in Fig. 2, the front edge of the cover will be elevated to the proper extent. The perforation, slotting, displacing, or complete removal of the front portion of the pendent flange or part $d$ of the cover serves to convert this portion of the cover into a strainer when the cover is lifted, and so long as this is provided for by opening a way under the supporting-flange $h$ of the cover for the outflow of steam or liquid it is not material how the part of the cover which enters the vessel is modified. The cover is, as before stated, detachable from the vessel—that is, it is not hinged thereto or secured thereto otherwise.

By my construction the utensil may be handled and the cover manipulated with one hand, and without risk or danger of being scalded, and the cover is also prevented from tumbling off while the vessel is being manipulated.

Having thus described my invention, I claim—

1. The combination with a vessel having a handle, of a detachable or loose cover therefor having a handle which, when the cover is in place, extends out over and a little above the handle on the vessel, whereby the two handles are in position to be grasped and brought together by one hand, thereby rocking the cover about its rear edge as a fulcrum and raising its front edge, as and for the purposes set forth.

2. The combination with a vessel having a handle, of a detachable or loose cover therefor having also a handle which projects out over and stands a little above the handle on the vessel, a supporting-flange to rest on the vessel when the cover is down in place, and a pendent portion or flange which extends down into the vessel, said pendent flange having formed in it a passage-way for the escape of steam or liquid from the vessel when the cover is tilted by depressing its handle, substantially as set forth.

3. The combination with a vessel having a handle $b$, of a cover A for said vessel having a handle $a$ adapted to project out over and stand a little above the handle of the vessel, whereby the two handles may be grasped with one hand, said cover having a pendent flange $d$ with an aperture in it at a point opposite the handle $a$, substantially as and for the purpose set forth.

4. A cover A for a saucepan or similar vessel, having a handle $a$, and a pendent flange $d$ provided with apertures at the side opposite the handle, as set forth.

In witness whereof I have hereunto signed my name in the presence of two subscribing witnesses.

RICHARD CLAYTON.

Witnesses:
STEPHEN WATKINS,
ROBERT M. LISTER.